(12) United States Patent
Nawata et al.

(10) Patent No.: US 11,170,722 B2
(45) Date of Patent: Nov. 9, 2021

(54) DISPLAY DEVICE WITH A BACKLIGHT

(71) Applicant: NIPPON SEIKI CO., LTD., Niigata (JP)

(72) Inventors: Yu Nawata, Niigata (JP); Yasuyuki Fujitsuka, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 16/969,120

(22) PCT Filed: Mar. 8, 2019

(86) PCT No.: PCT/JP2019/009408
§ 371 (c)(1),
(2) Date: Aug. 11, 2020

(87) PCT Pub. No.: WO2019/176788
PCT Pub. Date: Sep. 19, 2019

(65) Prior Publication Data
US 2021/0043151 A1 Feb. 11, 2021

(30) Foreign Application Priority Data

Mar. 13, 2018 (JP) .............................. JP2018-045297

(51) Int. Cl.
*G09G 3/36* (2006.01)
*G09G 3/34* (2006.01)
(Continued)

(52) U.S. Cl.
CPC ..... *G09G 3/3406* (2013.01); *G02F 1/133603* (2013.01); *G09G 3/36* (2013.01);
(Continued)

(58) Field of Classification Search
CPC .......... G09G 3/36; G09G 3/34; G09G 3/3406; G09G 2320/0626; G09G 3/32; G09G 5/00; G02F 1/133603; G06F 3/038
See application file for complete search history.

(56) References Cited

U.S. PATENT DOCUMENTS

2012/0200485 A1 8/2012 Uchibe
2014/0104082 A1 4/2014 Nakamura et al.
(Continued)

FOREIGN PATENT DOCUMENTS

JP 2007-279395 A 10/2007
JP 2011-118001 A 6/2011
(Continued)

OTHER PUBLICATIONS

International Search Report issued in corresponding International Patent Application No. PCT/JP2019/009408, dated Apr. 23, 2019, with English translation.

*Primary Examiner* — Pegeman Karimi
(74) *Attorney, Agent, or Firm* — McDermott Will & Emery LLP

(57) ABSTRACT

Provided is a display device with which a suitable image can be displayed with a simple device configuration. The display device has: a display panel which displays an image on the basis of a plurality of image patterns; a plurality of light sources which illuminate, from the back surface, respective regions of the display panel that has been divided into a plurality of regions; a storage unit which stores luminance information in which the respective image patterns and the luminance of the respective light sources in the image pattern are associated with each other; and a luminance control unit which controls the luminance of each of the light sources on the basis of the luminance information. The luminance control unit gradually changes the luminance of
(Continued)

the light sources from the luminance of the light source before a change to the luminance of the light source after the change.

4 Claims, 11 Drawing Sheets

(51) Int. Cl.
  *G02F 1/13357* (2006.01)
  *B60K 35/00* (2006.01)
(52) U.S. Cl.
  CPC ........ *B60K 35/00* (2013.01); *B60K 2370/166* (2019.05); *B60K 2370/167* (2019.05); *B60K 2370/33* (2019.05); *B60K 2370/52* (2019.05); *G09G 2320/0626* (2013.01); *G09G 2380/10* (2013.01)

(56) References Cited

U.S. PATENT DOCUMENTS

| | | | |
|---|---|---|---|
| 2015/0009246 A1* | 1/2015 | Watanabe | G09G 3/3413 |
| | | | 345/690 |
| 2016/0111047 A1* | 4/2016 | Yamato | G09G 3/3611 |
| | | | 345/102 |
| 2017/0132488 A1* | 5/2017 | Asanuma | G06T 5/00 |
| 2017/0365225 A1* | 12/2017 | Yoneyama | G02F 1/134309 |

FOREIGN PATENT DOCUMENTS

| | | |
|---|---|---|
| JP | 2011-128595 A | 6/2011 |
| JP | 2012-048074 A | 3/2012 |
| WO | 2011/021663 A1 | 2/2011 |
| WO | 2011/065068 A1 | 6/2011 |
| WO | 2013/042161 A1 | 3/2013 |
| WO | 2016/027705 A1 | 2/2016 |

\* cited by examiner

| AREA | AREA40e | | | | AREA40d | | | | AREA40f | | | |
|---|---|---|---|---|---|---|---|---|---|---|---|---|
| PIXEL POSITION | 1 | 2 | 3 | 4 | 5 | 6 | 7 | 8 | 9 | 10 | 11 | 12 |
| PANEL LUMINANCE | 20 | 20 | 20 | 20 | 60 | 60 | 300 | 300 | 500 | 500 | 500 | 500 |
| PANEL TRANSMITTANCE(%) | 1 | 1 | 1 | 1 | 1 | 1 | 5 | 5 | 5 | 5 | 5 | 5 |
| LED LUMINACE(%) | 20 | | | | 60 | | | | 100 | | | |

| AREA | AREA40e | | | | AREA40d | | | | AREA40f | | | |
|---|---|---|---|---|---|---|---|---|---|---|---|---|
| PIXEL POSITION | 1 | 2 | 3 | 4 | 5 | 6 | 7 | 8 | 9 | 10 | 11 | 12 |
| PANEL LUMINANCE | 25 | 25 | 25 | 50 | 120 | 180 | 180 | 240 | 380 | 475 | 475 | 475 |
| PANEL TRANSMITTANCE(%) | 1 | 1 | 1 | 2 | 2 | 3 | 3 | 4 | 4 | 5 | 5 | 5 |
| LED LUMINACE(%) | 25 | | | | 60 | | | | 95 | | | |

DISPLAY DEVICE WITH A BACKLIGHT

CROSS REFERENCE

This application is the U.S. National Phase under 35 U.S.C. § 371 of International Application No. PCT/JP2019/009408, filed on Mar. 8, 2019, which claims the benefit of Japanese Application No. 2018-045297, filed on Mar. 13, 2018, the entire contents of each are hereby incorporated by reference.

TECHNICAL FIELD

The present invention relates to a display device.

BACKGROUND ART

Conventionally, as a control technique for a liquid crystal display panel that displays an image and a backlight including a plurality of light sources that illuminate the liquid crystal display panel from a back side, a technique (local dimming control) is known in which a display surface of the liquid crystal display panel is divided into a plurality of display areas and a maximum value (peak luminance value) of luminance values of pixels in each of the display areas is detected to control a brightness of the backlight for each of the display areas according to the peak luminance value (Patent Document 1).

PRIOR ART DOCUMENT

Patent Document

Patent Document 1: Japanese Unexamined Patent Application Publication No. 2007-279395

SUMMARY OF THE INVENTION

Problems to be Solved by the Invention

The above-mentioned local dimming control is effective in that a dynamic range can be secured. However, it is necessary to perform a process for detecting the peak luminance value every time for each display area according to an image signal relating to the obtained image. Therefore, it is necessary to provide a dedicated algorithm for detecting the peak luminance value and to provide a dedicated integrated circuit for local dimming control. This increases total complexity of a processing system of a device and manufacturing cost.

The present invention has been made in consideration of these circumstances, and an object thereof is to provide a display device capable of suitably displaying an image with a simple device configuration.

Solution to Problem

To solve the problems described above, a display device according to the present invention includes a display panel that displays an image based on a plurality of image patterns, a plurality of light sources that illuminate, area by area, the display panel divided into a plurality of areas, from a back side, a storage unit that stores luminance information in which each of the image patterns and a luminance of each of the light sources in the image pattern are associated with each other, and a luminance control unit that controls the luminance of each of the light sources based on the luminance information.

Effect of the Invention

In a display device according to the present invention, it is possible to suitably display an image with a simple device configuration.

BRIEF DESCRIPTION OF THE DRAWINGS

FIG. 11C is a graph showing a relationship between the luminance of the display panel relating to the display device in the comparative example shown in FIG. 11A and the luminance of the display panel of the present embodiment shown in FIG. 11B.

MODE FOR CARRYING OUT THE INVENTION

An embodiment of a display device according to the present invention will be described with reference to the accompanying drawings. The display device according to the present invention can be applied to all display devices provided with a display panel including a backlight, and may be mounted on a vehicle such as an automobile or a motorcycle, a ship, an agricultural machine, or a construction machine. In the present embodiment, an example in which the display device according to the present invention is mounted on an automobile and includes a liquid crystal display panel will be described.

Figure 1:
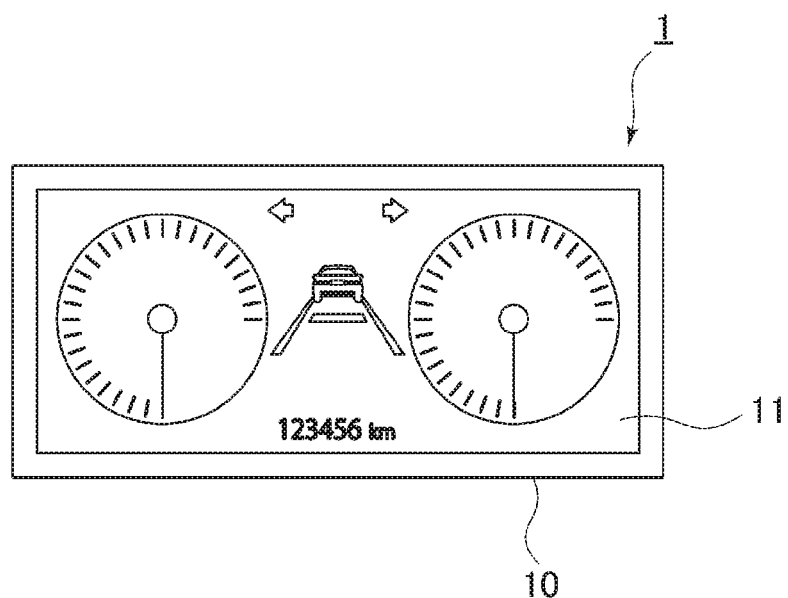
FIG. 1 is a front view illustrating a display device being an embodiment of a display device according to the present invention.

FIG. 1 is a front view illustrating a display device 1 being an embodiment of a display device according to the present invention.

Figure 2:
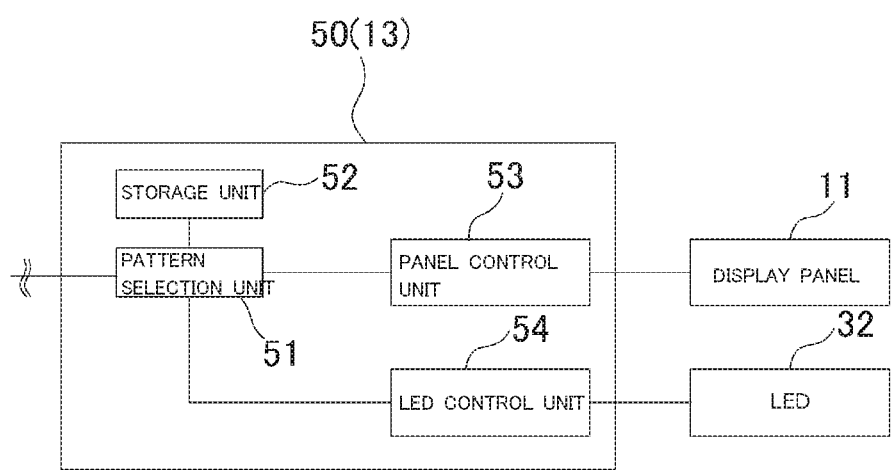
FIG. 2 is a schematic functional block diagram illustrating a functional configuration of the display device.

FIG. 2 is a schematic functional block diagram illustrating a functional configuration of the display device 1.

Figure 3:
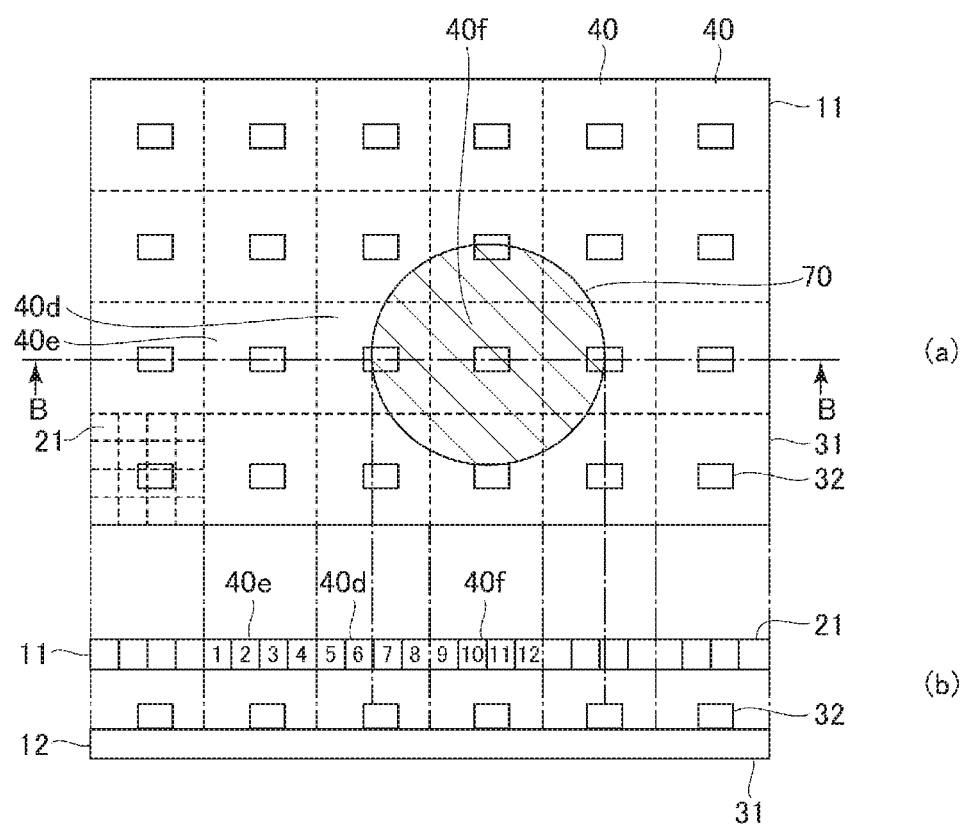
FIGS. 3A and 3B are schematic explanatory diagrams of a light source substrate including a display panel and a backlight unit.

FIGS. 3A and 3B are schematic explanatory diagrams of a light source substrate 31 including a display panel 11 and a backlight unit 12. FIG. 3A is a front view and FIG. 3B is a cross-sectional view taken along a line B-B.

In the following description, a "front side" means a front side in FIG. 1 and an upper side (side of the display panel 11) in FIGS. 3A and 3B that is visible to a viewer (driver). A "back side" means a back side in FIG. 1 and a lower side (side of the light source substrate 31) in FIGS. 3A and 3B.

The display device 1 mainly includes a case 10, the display panel 11, the backlight unit 12, and a circuit board 13.

The case 10 accommodates the display panel 11, the backlight unit 12, and the circuit board 13 in an internal space. The case 10 defines the appearance of the display device 1.

The display panel 11 is a Thin Film Transistor (TFT) type liquid crystal display panel. The display panel 11 includes a pair of surface glass substrates enclosing a liquid crystal layer. Transparent electrodes made of Indium Tin Oxide (ITO) or the like are formed on the pair of glass substrates. Further, the display panel 11 includes a pair of surface polarizing plates (polarizing filters) arranged to sandwich the pair of surface glass substrates. The display panel 11 is connected to the circuit board 13 via Flexible Printed Circuits (FPCs). The display panel 11 is controlled by a control unit 50 of the circuit board 13 to apply a drive voltage to the liquid crystal layer via the transparent electrodes. As a result, the orientation of the liquid crystal molecules in the liquid crystal layer is controlled, and the transmittance of each pixel 21 of the display panel 11 changes. With a combination of these pixels 21, the display panel 11 displays an image based on a plurality of image patterns (described later) stored in advance.

The backlight unit 12 is provided on the back side of the display panel 11. The backlight unit 12 includes the light source substrate 31 and a light guide body (not illustrated), and illuminates the display panel 11 from the back side. On the light source substrate 31, a plurality of Light Emitting Diodes (LEDs) 32, which are an example of a light source, are mounted. The light source substrate 31 is connected to the circuit board 13 via a flexible substrate such as an FPC. If a drive current is supplied, the LED 32 emits light toward the display panel 11 (light guide body). The light guide body guides the light emitted by the LED 32 toward the display panel 11. The light guide body is formed of a transparent resin such as a polymethyl methacrylate resin (PMMA) formed in a flat plate shape.

As illustrated in FIGS. 3A and 3B, the display panel 11 is divided into a plurality of areas 40, and each of the areas 40 is illuminated by one of the LEDs 32 from the back side. Each of the areas 40 includes a plurality of the pixels 21 (4*4 pixels in FIGS. 3A and 3B, for example). Therefore, one of the LEDs 32 illuminates the plurality of pixels 21 included in the area 40. In other words, the area 40 is an illumination range of one of the LEDs 32, and this illumination range includes a plurality of the pixels 21.

The circuit board 13 mainly includes the control unit 50 for controlling the display panel 11 and the backlight unit 12.

The control unit 50 includes a Central Processing Unit (CPU), a Read Only Memory (ROM), a Random Access Memory (RAM), and the like, and executes a predetermined arithmetic process according to a program written in the ROM, for example. The control unit 50 acquires, for example, a vehicle speed, an engine speed, various types of vehicle information, navigation information, and the like from an Electronic Control Unit (ECU) of a vehicle via various types of sensors or the like. Based on the acquired information, the control unit 50 causes the display panel 11 to display information.

The control unit 50 includes a pattern selection unit 51, a storage unit 52, a panel control unit 53, and an LED control unit 54.

The pattern selection unit 51 selects a required image pattern from a plurality of image patterns (described later) based on information requested to be displayed on the display panel 11 based on the information obtained from the ECU, for example. The pattern selection unit 51 reads luminance information from the storage unit 52 based on the selected image pattern. The pattern selection unit 51 controls the panel control unit 53 and the LED control unit 54 based on the luminance information.

The storage unit 52 stores luminance information (described later) in which each of the image patterns and the luminance of each of the LEDs 32 in the image pattern are associated with each other.

The panel control unit 53 is a so-called Graphics Display Controller (GDC) that generates a required image based on an instruction from the pattern selection unit 51 or the like and displays the image on the display panel 11. The panel control unit 53 (transmittance control unit) particularly controls the drive voltage of the liquid crystal layer to control the transmittance of each of the pixels 21.

The LED control unit 54 (luminance control unit) controls the luminance of each of the LEDs 32 based on an instruction from the pattern selection unit 51 or the like, that is, based on the luminance information.

Here, as in the display device 1 according to the present embodiment, in a case where the plurality of LEDs 32 illuminates, area by area, the display panel 11 divided into the plurality of areas 40, from the back side, local dimming control is used. The local dimming control is used for a television or the like. In the local dimming control, luminance for the areas 40 each corresponding to one of the LEDs 32 is individually controlled. However, to suitably perform the local dimming control, an IC for integrally processing the display panel 11 and the LEDs 32, and a dedicated algorithm are required. For example, this IC calculates the optimum luminance of the LEDs 32 based on an image display instruction obtained from the control unit 50, and appropriately corrects image information when generating an image. However, the provision of this IC increases the complexity of the processing system of the entire display device 1 and the manufacturing cost.

On the other hand, if the display device 1 is used for an automobile, a display content (image) of the display device 1 is limited compared with a use in a television or the like, and thus, the display content can be displayed by using patterns to some extent. Therefore, the display device 1 according to the present embodiment stores the luminance of the LED 32 for each of the areas 40 corresponding to the image pattern as luminance information, and reads the luminance information to control the LED 32. Thus, a correction process and the like required for the luminance of the LED 32 and the generation of the image is not performed in real time at a timing when the image is switched. Therefore, the display device 1 does not require a dedicated IC for local dimming control, an algorithm thereof, and the like, and thus, the device configuration can be simplified and an increase in manufacturing cost can be suppressed. Below, a luminance control process in the display device 1 according to the present embodiment will be described in detail.

Figure 4A:
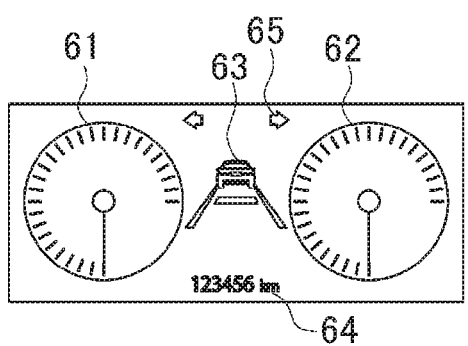
FIG. 4A is an explanatory diagram illustrating an example of a first image pattern.
Figure 5A:
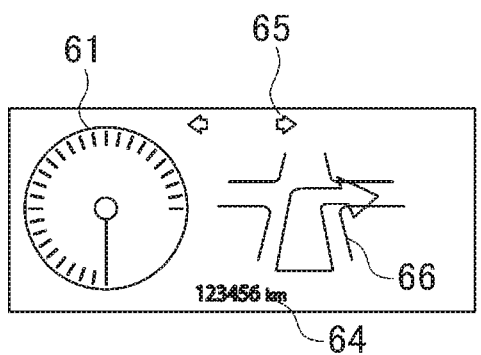
FIG. 5A is an explanatory diagram illustrating an example of a second image pattern.
Figure 6A:
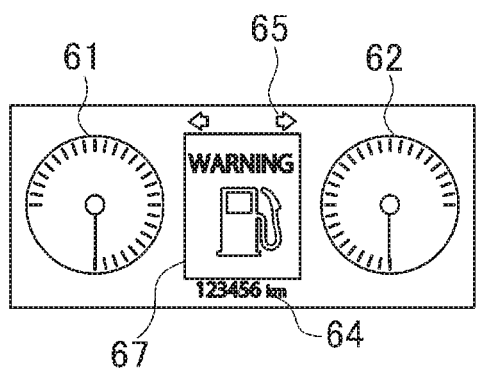
FIG. 6A is an explanatory diagram illustrating an example of a third image pattern.

FIGS. 4A, 5A, and 6A are explanatory diagrams illustrating an example of an image pattern.

For example, three image patterns, that are a first image pattern to a third image pattern, are prepared, and the three image patterns are distinguished according to the content displayed on the display panel 11, for example.

As illustrated in FIG. 4A, the first image pattern includes images representing a speedometer 61 and an engine tachometer 62, which are on left and right sides of the display panel 11, respectively. Further, the first image pattern includes an image of a vehicle 63 traveling in front of a vehicle of the viewer, a travel distance 64, and an indicator 65 indicating a left/right turn direction, between the speedometer 61 and the engine tachometer 62.

As illustrated in FIG. 5A, the second image pattern includes an image representing the speedometer 61 on the left side of the display panel 11. Further, the second image pattern includes navigation information 66 (route guidance), the travel distance 64, and the indicator 65 indicating the right/left turn direction on the right side of the display panel 11.

As illustrated in FIG. 6A, the third image pattern includes images representing the speedometer 61 and the engine tachometer 62, which are on the left and right sides of the display panel 11, respectively. Further, the third image pattern includes, for example, an image indicating a warning 67 that a remaining amount of fuel is low, the travel distance 64, and the indicator 65 indicating the left/right turn direction, between the speedometer 61 and the engine tachometer 62.

Figure 4B:
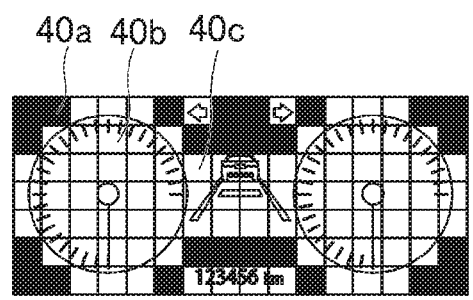
FIG. 4B is an explanatory diagram conceptually illustrating luminance information corresponding to the first image pattern.
Figure 5B:
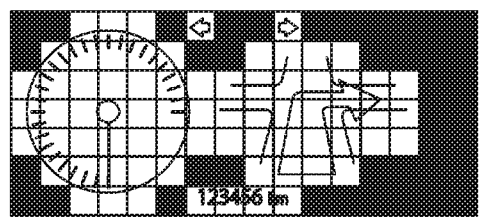
FIG. 5B is an explanatory diagram conceptually illustrating luminance information corresponding to the second image pattern.
Figure 6B:
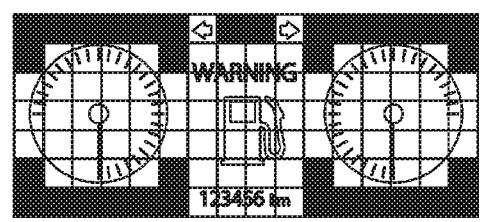
FIG. 6B is an explanatory diagram conceptually illustrating luminance information corresponding to the third image pattern.

FIGS. 4B, 5B, and 6B are explanatory diagrams conceptually illustrating luminance information corresponding to the image patterns.

The luminance information is information in which each of the image patterns and the luminance of each of the LEDs 32 in the image pattern are associated with each other. That is, as illustrated in FIG. 4B, an area 40a in the first image pattern has no image to be displayed (formed) and does not need to be illuminated by the LED 32. Therefore, the luminance of the LED 32 in the area 40a is set to 0% (a minimum value of the brightness, a state in which LED 32 is turned off). On the other hand, for example, an area 40b in which the image of the speedometer 61 is displayed is an area that needs to be illuminated by the LED 32. Therefore, the luminance of the LED 32 in the area 40b is set to 100% (a maximum value of the brightness). Further, the luminance of the LED 32 is also set to values other than 0% and 100%. For example, the luminance of the LED 32 is set to 75% in an area 40c in which the luminance of the image is set lower than in the area 40b. The luminance is preferably determined according to the necessity of the display content (information) for the driver.

In FIGS. 5B and 6B, similarly to FIG. 4B, the areas 40 in which the luminance of the LED 32 is set low are represented as black portions (filled portions), and the areas 40 in which the luminance is set high are represented as white portions.

Next, the luminance control process of the LED 32 executed by the control unit 50 will be described.

Figure 7:
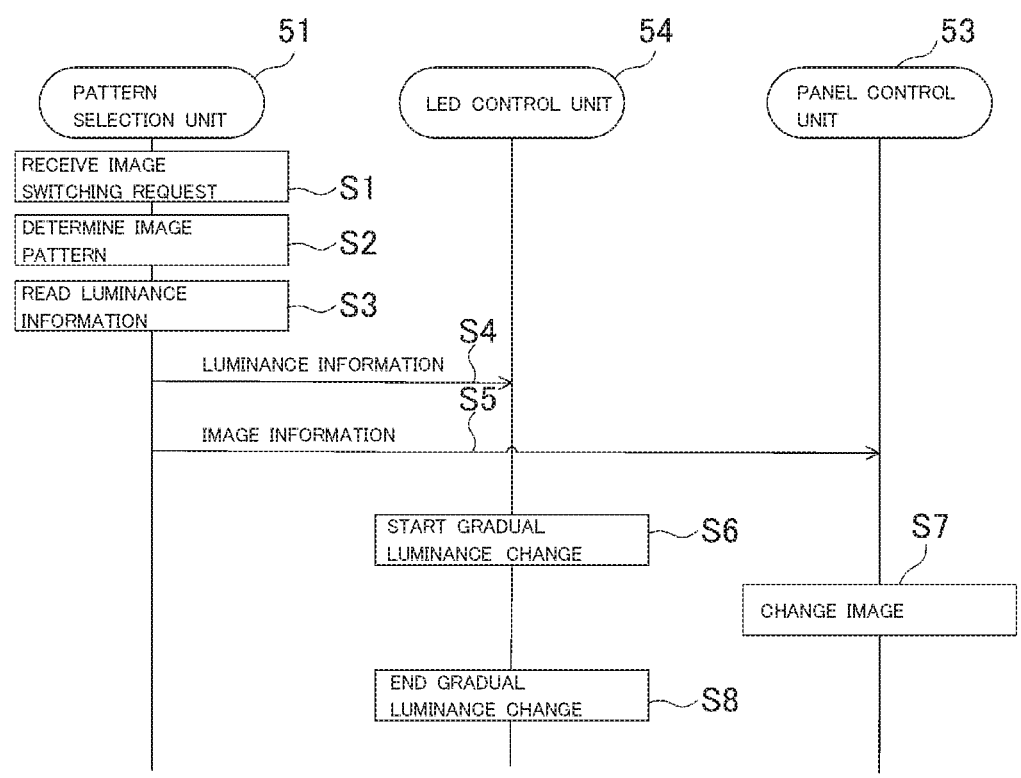
FIG. 7 is a sequence diagram for describing a luminance control process executed by the display device according to the present embodiment.

FIG. 7 is a sequence diagram for describing the luminance control process executed by the display device 1 according to the present embodiment.

Figure 8A:
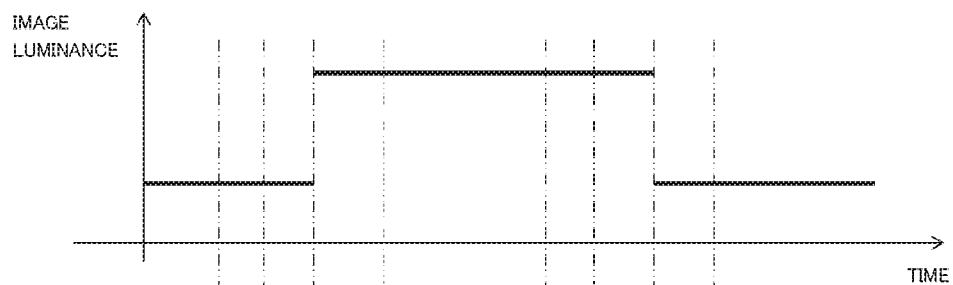
FIGS. 8A and 8B are graphs for describing the luminance control process of FIG. 7.
Figure 8B:
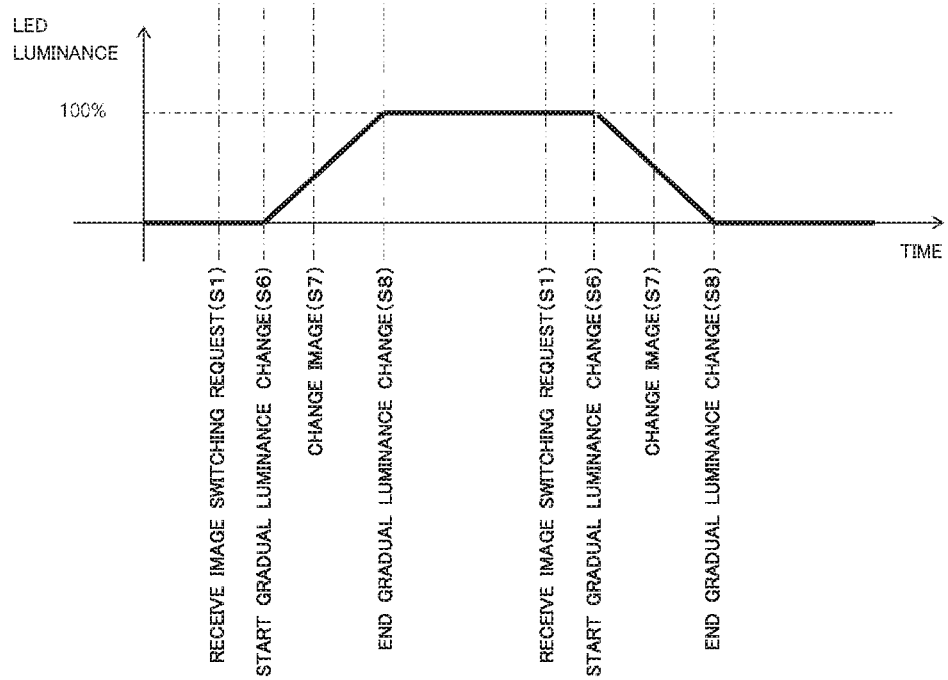

FIGS. 8A and 8B are graphs for describing the luminance control process of FIG. 7. FIG. 8A is a graph for describing a relationship between the luminance of an image and time. FIG. 8B is a graph for describing a relationship between the luminance of the LEDs 32 and time.

In step S1, the pattern selection unit 51 receives an image switching request being a request to switch an image displayed on the display panel 11. In step S2, the pattern selection unit 51 selects, based on the image switching request, a corresponding image pattern from image patterns retained in advance. For example, if the pattern selection unit 51 receives a request for displaying navigation information, the pattern selection unit 51 selects the second image pattern that displays the navigation information 66 as illustrated in FIG. 5A.

In step S3, the pattern selection unit 51 reads the luminance information from the storage unit 52 based on the selected image pattern. That is, the pattern selection unit 51 acquires information about the luminance of the LEDs 32 for illuminating each of the areas 40 in the selected image pattern. In step S4, the pattern selection unit 51 transmits the luminance information to the LED control unit 54. In step S5, the pattern selection unit 51 transmits, to the panel control unit 53, image information being information for generating an image corresponding to the image switching request and the selected image pattern.

In step S6, the LED control unit 54 changes, based on the received luminance information, the current luminance of the LED 32 to a luminance instructed by the luminance information. At this time, the LED control unit 54 gradually changes the luminance of the LED 32 from the luminance of the LED 32 before the change (current luminance) to the luminance of the LED 32 after the change. Therefore, step S6 is a step in which the LED control unit 54 starts the change, that is, starts changing the luminance of the LED 32 to the luminance after the change.

In step S7, the panel control unit 53 changes the image displayed on the display panel 11 based on the received image information. Step S7 is executed after the LED control unit 54 starts changing the luminance. This is because the speed of changing the image is faster than the speed of changing the luminance of the LED 32. In step S8, the LED control unit 54 finishes the gradual change of the luminance of the LED 32, that is, completes the change to the luminance instructed in the luminance information.

An example of the luminance control process will be described with reference to FIGS. 8A and 8B.

For example, an image with low luminance (0% of the luminance of the LED 32) is displayed in one of the areas 40, and the pattern selection unit 51 receives an image switching request to change the image to an image with high luminance (100% of the luminance of the LED 32) (step S1). Based on the received luminance information (step S4), the LED control unit 54 gradually changes the luminance to 100% (steps S6 and S8). For example, if t seconds are required from the start to the end of the change of the luminance, the LED control unit 54 increases the luminance to 25% at a time ¼ t seconds after the start. The LED control unit 54 increases the luminance to 50% at ²⁄₄t seconds after the start. Further, the LED control unit 54 increases the luminance to 75% at ¾t seconds after the start. On the other hand, the panel control unit 53 changes the image during a time period from the start of the luminance change of the LED 32 to the end of the luminance change (step S7).

The processes are similar in a case where an image switching request for changing an image with high luminance to an image with low luminance is received, as illustrated in FIGS. 8A and 8B.

Thus, an image based on the image switching request is appropriately displayed on the display panel 11. In particular, the display device 1 gradually changes the luminance of the LED 32, and thus, it is possible to display the image without the driver experiencing a feeling of discomfort.

That is, in such a luminance control process, the panel control unit 53 that controls the display panel 11 and the LED control unit 54 that controls the LEDs 32 each receive an instruction from the pattern selection unit 51 to control the display panel 11 and the LEDs 32. Therefore, the timing of switching the image on the display panel 11 and the timing of changing the luminance of the LED 32 may deviate from each other. This deviation causes the viewer to experience a feeling of discomfort. Regarding this, the display device 1 can mitigate the feeling of discomfort from the deviation by gradually changing the luminance during the image change to achieve a visual effect in which the image is gradually displayed.

It is noted that the feeling of discomfort from the deviation can be mitigated by the visual effect in which the image is gradually displayed. On the other hand, there may be a problem in that the driver notices information having a high degree of importance such as a warning with a delay. Therefore, the display device 1 may perform different luminance control (or may use different luminance change speed) depending on the degree of importance of the image.

That is, if the display panel 11 displays the first image pattern or a first image, the LED control unit 54 gradually changes, in accordance with the luminance control process described in FIG. 7, the luminance of the LED 32 from the luminance of the LED 32 before the change to the luminance of the LED 32 after the change. Further, if the display panel 11 displays the second image pattern or a second image, the LED control unit 54 immediately changes the luminance of the LED 32 from the luminance of the LED 32 before the change to the luminance of the LED 32 after the change, as described later with reference to FIG. 9. It is noted that the above-mentioned "second image pattern or second image" means information having a higher degree of importance than the "first image pattern or first image". Below, a luminance control process in accordance with the degree of importance will be described in detail.

If the luminance control process is performed in accordance with the degree of importance, the storage unit 52 stores the luminance information in which the image pattern and a change mode of the luminance of the LED 32 are associated with each other in consideration of the degree of importance of the image pattern. The degree of importance may be set for each image pattern or may be set for each image (display content) in the image pattern. The luminance information includes control information indicating that the luminance of the LED 32 is to be changed immediately, and not gradually, for an image pattern or an image (image pattern etc.) having a high degree of importance. The "immediate change" may be a change at a speed faster than the change of the luminance of the LED 32 in the luminance control process of FIG. 7, and may be relatively fast with respect to the "gradual change". That is, the display device 1 gradually changes the luminance of the LED 32 of a normal image pattern etc. (having a low degree of importance). Further, the display device 1 changes the luminance of the LED 32 of an image pattern etc. having a high degree of importance faster than the luminance of the LED 32 of the normal image pattern etc., to immediately switch the image.

For example, the degree of importance can be determined according to a degree of urgency of the notification to the driver. For example, the image indicating the warning 67 that the remaining amount of fuel is low in the third image pattern in FIGS. 6A and 6B is an image (information) having at a higher degree of importance than other images in the third image pattern, the first image pattern, and the second image pattern. In addition to the warning 67 illustrated in FIGS. 6A and 6B, examples of information having a high degree of importance includes an image (information) for urging a braking operation, an image for informing about a danger, and the like.

Figure 9:
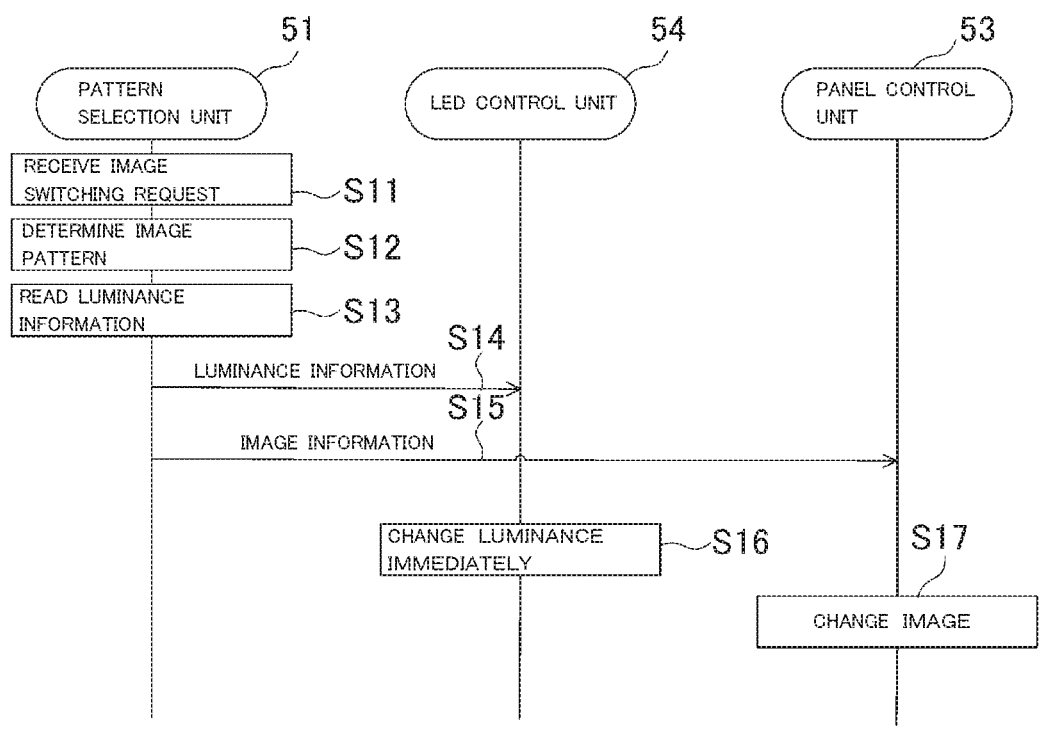
FIG. 9 is a sequence diagram for describing another luminance control process executed by the display device according to the present embodiment.

FIG. 9 is a sequence diagram for describing another luminance control process executed by the display device 1 according to the present embodiment.

Figure 10A:
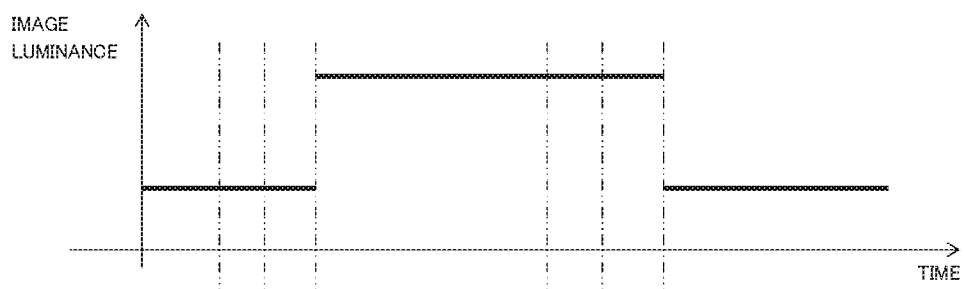
FIGS. 10A and 10B are graphs for describing the luminance control process of FIG. 9.
Figure 10B:
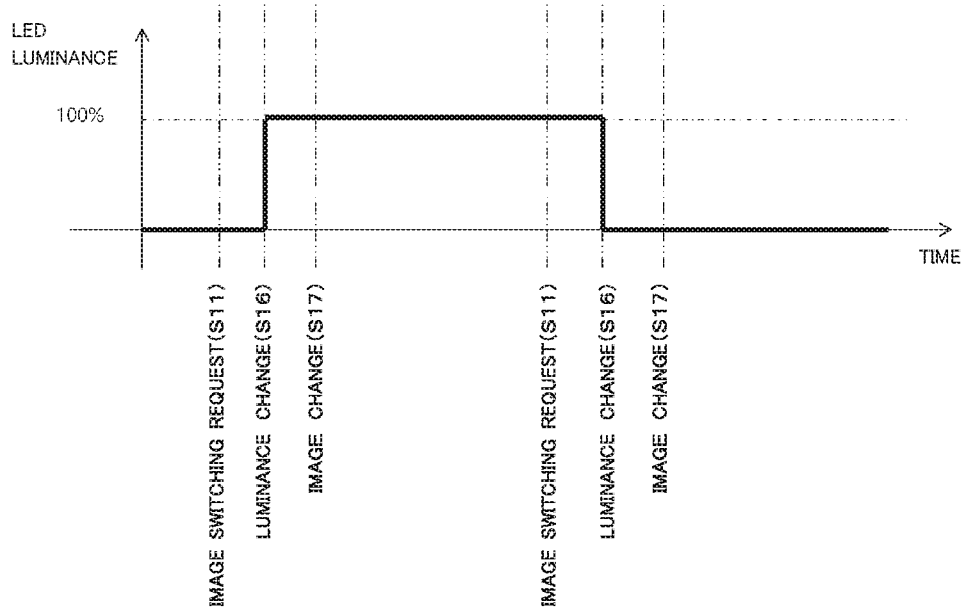

FIGS. 10A and 10B are graphs for describing the luminance control process of FIG. 9. FIG. 10A is a graph for describing a relationship between the luminance of an image and time. FIG. 10B is a graph for describing a relationship between the luminance of the LED 32 and time.

Steps S11 and S12 are similar to steps S1 and S2 of FIG. 7, and thus, description thereof will be omitted. In step S13, the pattern selection unit 51 reads the luminance information from the storage unit 52 based on the selected image pattern. At this time, luminance information regarding an image pattern etc. having a high degree of importance includes control information indicating that the luminance of the LED 32 is to be changed immediately.

In step S14, the pattern selection unit 51 transmits the luminance information to the LED control unit 54. At this time, if the luminance information includes the control information indicating that the luminance of the LED 32 is to be changed immediately, the pattern selection unit 51 gives an instruction of immediately changing the luminance of the LED 32. Step S15 is similar to step S5 of FIG. 7, and thus, description thereof will be omitted. In step S16, the LED control unit 54 changes, based on the received luminance information, the current luminance of the LED 32 to a luminance instructed by the luminance information. At this time, the LED control unit 54 immediately changes the luminance of the LED 32 from the current luminance of the LED 32 before the change (current luminance) to the luminance of the LED 32 after the change. In step S17, the panel control unit 53 changes the image displayed on the display panel 11 based on the received image information. Step S17 is executed after the LED control unit 54 changes the luminance (the change is completed).

An example of the luminance control process will be described with reference to FIGS. 10A and 10B.

For example, an image with low luminance (0% of the luminance of the LED 32) is displayed in one of the areas 40, and the pattern selection unit 51 receives an image switching request to change the image to an image with high luminance (100% of the luminance of the LED 32) (step S11). Based on the luminance information of the storage unit 52 (step S14), the pattern selection unit 51 immediately changes the luminance to 100% (step S16). On the other hand, the panel control unit 53 changes the image after the luminance of the LED 32 is changed (step S17).

The processes are similar in the case where an image switching request for changing an image with high luminance to an image with low luminance is received, as illustrated in FIGS. 8A and 8B.

As described above, the display device 1 immediately displays an image pattern etc. having a high degree of importance, as compared to a case where the luminance control process of FIG. 7 is executed. As a result, the display device 1 can appropriately convey necessary information to the driver according to the degree of urgency and the like.

The display device 1 according to the present embodiment described above can suitably display an image with a simple device configuration.

Incidentally, as illustrated in FIGS. 3A and 3B, the plurality of pixels 21 are included in the illumination range (the area 40) of the LED 32. Therefore, an area 40d including a boundary of an image 70 may include the pixels 21 having different luminance.

Figures 11, 11A, 11B:
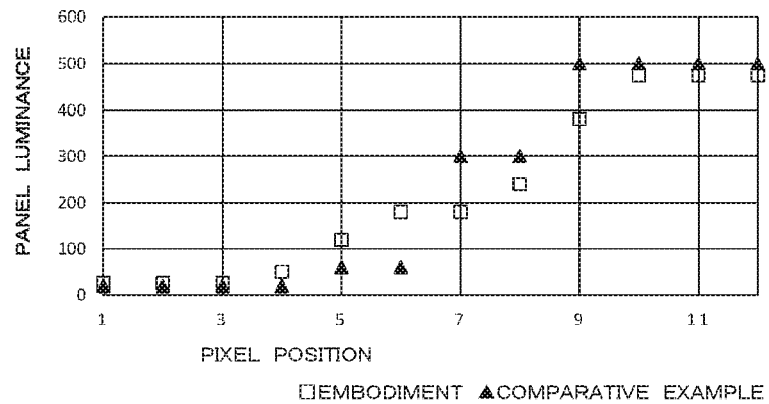
FIG. 11A is a table showing a relationship between transmittance of the display panel and luminance of LEDs in a comparative example.
FIG. 11B is a table showing a relationship between the transmittance of the display panel and the luminance of the LEDs in the display device according to the present embodiment.

For example, FIG. 11A is a table showing a relationship between the transmittance of the display panel 11 and the luminance of the LEDs 32 in a comparative example. In FIGS. 11A to 11C, a "pixel position" corresponds to numbers assigned to the pixels 21 in areas 40e, 40d, and 40f of FIG. 3B. Further, a "panel luminance" is a value obtained by multiplying the transmittance of the display panel 11 and the luminance of the LED 32.

The area 40d in FIG. 3A includes the boundary of the image 70 (between a pixel position 6 and a pixel position 7). Therefore, the pixels 21 having different transmittance, that is, the pixel 21 having high luminance (5% transmittance) and the pixel 21 having low luminance (1% transmittance) may be included. In this case, the LED 32 selects the luminance so that the image 70 is optimally displayed in the area 40d including the boundary of the image 70 and performs illumination. Specifically, the luminance of the LED 32 in the area 40d is set to 60% which is an average value obtained from a value of 20% of the luminance of the LED 32 in the area 40e that does not include the image 70 and is adjacent to the area 40d, and a value of 100% of the luminance of the LED 32 in the area 40f including the image 70 and being adjacent to the area 40d. That is, in the area 40d including the boundary of the image 70, an average luminance value of the luminance of the LED 32 in the area 40e including only the pixels 21 with low luminance, and the luminance of the LED 32 in the area 40f including only the pixels 21 with high luminance is used to perform illumination by the LEDs 32.

If control is performed in this way, although the image 70 is displayed over the area 40d and the area 40f on the display panel 11, the luminance of the LED 32 is different at the boundary between the area 40d and the area 40f, and thus, the difference in luminance of the display panel 11 is noticeable at the boundary. In the example of FIG. 11A, the luminance of the LED 32 in the area 40d is 300 and the luminance of the LED 32 in the area 40f is 500, and thus, there is a difference in luminance of the display panel 11.

To eliminate this difference in luminance, the display device 1 according to the present embodiment gradually changes the transmittance of the pixels 21 included in the area 40d including the boundary of the image 70 and in the areas 40e and 40f adjacent to the area 40d, between the area 40d including the boundary of the image 70 and the areas 40e and 40f adjacent to the area 40d including the boundary of the image 70. This transmittance control is performed as follows. The storage unit 52 stores in advance, together with the luminance information, transmittance information set so that the transmittance of the pixels 21 included in the area 40d including the boundary of the image 70 and in the areas 40e and 40f adjacent to the area 40d including the boundary of the image 70 is gradually changed between the area 40d including the boundary of the image 70 and the areas 40e and 40f adjacent to the area 40d including the boundary of the image 70, and the panel control unit 53 (transmittance control unit) controls the transmittance of the pixels 21 based on the transmittance information. That is, the display device 1 stores in advance the transmittance regarding the boundary of the image 70 as the transmittance information, and reads the transmittance information to control the transmittance of the display panel 11.

FIG. 11B is a table showing a relationship between the transmittance of the display panel 11 and the luminance of the LEDs 32 in the display device 1 according to the present embodiment. FIG. 11C is a graph showing a relationship between the luminance of the display panel 11 relating to the display device 1 of the present embodiment shown in FIG. 11A and the luminance of the display panel 11 in the comparative example shown in FIG. 11B.

The display device 1 according to the present embodiment gradually changes the transmittance of the pixels 21 included in the area 40d including the boundary of the image 70 and in the area 40f adjacent to the area 40d (area including the image 70) from 2% to 5% between the area 40d and the area 40f Similarly, the display device 1 gradually changes the transmittance of the pixels 21 included in the area 40d including the boundary of the image 70 and in the area 40e adjacent to the area 40d (area not including the image 70) from 1% to 4% between the area 40d and the area 40e. That is, the transmittance of the display panel 11 at the boundary of the image 70 (between the pixel position 6 and the pixel position 7) is not abruptly changed, but the transmittance of the pixel 21 adjacent to the boundary is gradually changed (with a gradation).

At this time, the display device 1 also adjusts the luminance of the LED 32 to make the boundary unnoticeable. For example, as shown in FIG. 11B, the luminance of the area 40f is reduced (95%) and the luminance of the area 40e is increased (25%) in accordance with the luminance of the area 40d including the boundary which is 60%. It is possible to make the change in the luminance of the display panel 11 more gentle than in a case where the luminance of the LED 32 in the area 40f is set to 100% and the luminance of the LED 32 in the area 40e is set to 20% without considering the boundary, as shown in FIG. 11A.

Such transmittance control is performed by, for example, causing the pattern selection unit 51 to read the transmittance information from the storage unit 52 in step S3 of FIG. 7 and step S13 of FIG. 9, and to transmit an instruction to the panel control unit 53 in step S5 and in step S15.

By performing transmittance control in this way, the display device 1 can moderate the luminance difference of the display panel 11 at the boundary of the image 70, as shown in FIG. 11C, and thus, can suitably display the image 70 without the boundary being noticeable for the viewer.

Although some embodiments of the present invention have been described, these embodiments are presented by way of example and are not intended to limit the scope of the invention. These novel embodiments can be implemented in various other forms, and various omissions, replacements, and changes can be made without departing from the scope of the invention. These embodiments and modifications thereof are included in the scope and gist of the invention, and are included in the invention described in the claims and the equivalents thereof.

The display panel 11 is not limited to the liquid crystal display panel and may be any other display panels including a backlight.

The transmittance control described with reference to FIG. 11B may be executed independently of the luminance control process of FIGS. 7 and 9.

DESCRIPTION OF REFERENCE NUMERALS

1 Display device
10 Case

11 Display panel
12 Backlight unit
13 Circuit board
21 Pixel
31 Light source substrate
32 LED (Light Emitting Diode, light source)
40 Area
50 Control unit
51 Pattern selection unit
52 Storage unit
53 Panel control unit (transmittance control unit)
54 LED control unit (luminance control unit)
61 Speedometer
62 Engine tachometer
63 Vehicle
64 Travel distance
65 Indicator
66 Navigation information
67 Warning
70 Image

The invention claimed is:

1. A display device comprising:
a display panel that displays an image based on a plurality of image patterns;
a plurality of light sources that illuminate the display panel from a back side, wherein the display panel is divided into a plurality of areas, wherein the plurality of light sources illuminates the plurality of areas of the display panel, respectively, wherein each of the plurality of areas includes a plurality of pixels;
a storage that stores luminance information in which each of the image patterns and a luminance of each of the light sources in the image pattern are associated with each other;
a luminance controller that controls the luminance of each of the light sources based on the luminance information; and
a transmittance controller that controls a transmittance of each of the pixels of the display panel,
wherein the storage further stores transmittance information set so that a transmittance of the pixels included in an area including a boundary of the image and in an area adjacent to the area including the boundary of the image is gradually changed between the area including the boundary of the image and the area adjacent to the area including the boundary of the image, and
wherein the transmittance controller controls the transmittance of the pixels based on the transmittance information.

2. The display device according to claim 1, wherein the luminance controller gradually changes the luminance of the light source from a luminance of the light source before a change to a luminance of the light source after the change.

3. The display device according to claim 1, wherein the luminance controller gradually changes the luminance of the light source from a luminance of the light source before a change to a luminance of the light source after the change, if the display panel displays a first image pattern or a first image, and the luminance controller immediately changes the luminance of the light source from a luminance of the light source before a change to a luminance of the light source after the change, if the display panel displays a second image pattern or a second image.

4. The display device according to claim 3, wherein the second image pattern or the second image is information having a higher degree of importance than the first image pattern or the first image.

* * * * *